Nov. 26, 1929.     B. DARRACH, JR     1,736,998
SHIM
Original Filed Feb. 28. 1920

INVENTOR
Bradford Darrach, Jr.,
BY
Hammond & Littell
ATTORNEYS

Patented Nov. 26, 1929

1,736,998

UNITED STATES PATENT OFFICE

BRADFORD DARRACH, JR., OF HARTSDALE, NEW YORK, ASSIGNOR TO LAMINATED SHIM COMPANY, INC., OF LONG ISLAND CITY, NEW YORK, A CORPORATION OF NEW YORK

SHIM

Continuation of application Serial No. 362,095, filed February 28, 1920. This application filed March 19, 1927. Serial No. 176,673.

This invention relates to improvements in shims of the type commonly employed in connection with divided bearings for the purpose of holding the parts of the bearing in properly spaced relation, and adapted to be reduced in thickness by filing or by removing a portion of the body of the shim in order to permit the bearing parts to be adjusted to compensate for wear.

One of the objects of the invention is to provide a shim comprising a plurality of separable body portions, and means frictionally engaging the same to maintain them in assembled relation.

A further object of the invention consists in providing a shim having a plurality of separable body portions and means engaging the same adjacent the edges only thereof in order to maintain the body portions in closely assembled relation and to prevent oil dust or other matter from entering between adjacent portions of the body.

Further, the invention has for its object to provide a shim of this character with a facing, upon one of its edges, of Babbitt-metal or the like, which engages and forms a close fit for the shaft about its entire periphery without permitting the harder metal body of the shim from coming into contact with the shaft.

Further objects of the invention are to provide a shim of this character which will be efficient in use, simple in its construction, and economical to manufacture.

The present application is a continuation of my copending application, Serial Number 362,095, filed February 28, 1920.

Other objects will in part be obvious and in part be pointed out hereinafter.

For a full understanding of the invention, reference is to be had to the following description and to the accompanying drawing, in which.

Figure 1:
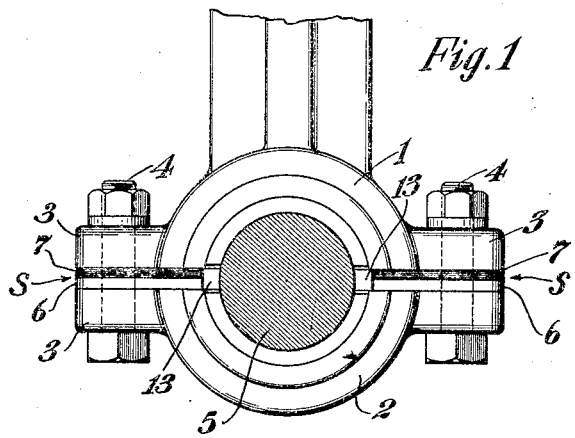
Figure 1 is a front elevation of a bearing provided with shims constructed in accordance with my invention.

Referring to the drawings, the invention is shown, for the purposes of illustration, as applied to a conventional bearing having two sections 1 and 2, provided with laterally extending lugs 3 connected to one another by bolts 4. Interposed between the meeting faces of the sections of the bearing, in order to hold them in correctly spaced relation to insure that the bearing will properly engage the shaft 5, are shims S. As shown in Figures 1 to 4, each of the shims includes two body portions 6 and 7, formed of any suitable material, such as brass or steel, arranged in superposed relation and provided with registering perforations 8 and 9 to receive the fastening bolts 4. In the shim shown in these figures, one of the body portions, as 6, is formed as a solid piece of material, and the other body portion 7 is formed of a plurality of laminated sheets united by a suitable binder adapted normally to hold them together as a unit while permitting the sheets to be removed when it is desired to reduce the thickness of the body portion. The thickness of the body portion 6 is preferably equal to the minimum thickness of shims which can be successfully used in the bearing. By making the body portion 6 of a single piece of material, the cost of manufacturing the shims will be considerably less than if the entire body thereof is formed of sheets secured to one another by a binding material.

At their inner or front edges, the body portions 6 and 7 are provided with registering recesses 10 and 11 adapted to receive correspondingly shaped tongues 12 formed on an independent facing member 13, formed of Babbitt-metal or the like, which engages the inner edges of the body portions 6 and 7. The tongues 12 fit closely within the registering recesses 10 and 11, and the friction between the engaging surfaces of these parts is sufficient to hold the body portions 6 and 7 normally assembled and in engagement with one another, while at the same time permitting one or both of the body portions to be detached from the facing member 13 if desired.

In use, when the bearing parts must be adjusted to compensate for wear, it is merely necessary to remove one or more of the sheets forming the body portion 7. When all of the sheets of the body portion 7 have been removed, the body portion 6 of the old shim may be united with a new laminated body portion 7 by means of a new facing member 13 to form another shim, thus effecting a further saving in the cost of manufacture.

The use of an independent facing member 13, which may be formed by stamping or cutting from a rolled sheet or the like, is much more economical than a facing member which is cast on the front of the shim.

Figure 5:
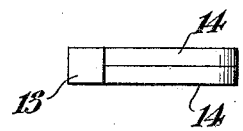
Figure 5 is an end view showing a modified construction of the shim.
Figure 2:
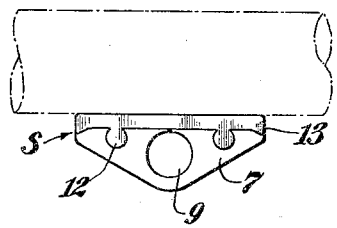
Figure 2 is a top plan view of one of the shims, the shaft being indicated in dotted lines.

In the modified form of shim shown in Figure 5, the two body portions 14, are both formed of a solid piece of material, and are held together by the facing member 13, as explained above. When this form of shim is used, the wear of the bearing parts is compensated for by filing or scraping one of the body portions to reduce the thickness thereof the desired amount.

Figure 6:
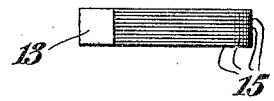
Figure 6 is a similar view showing another modified construction of the shim.
Figure 3:
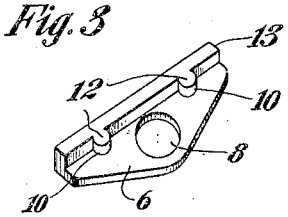
Figure 3 is a perspective view of the shim shown in Figures 1 and 2, the upper body portion being removed.

In Figure 6 a modified form of shim is shown in which the body thereof comprises a plurality of portions, each formed of a thin sheet 15. The sheets are held in assembled position solely by the facing member 13, without the use of other binding material, in the manner above set forth with respect to the shim shown in Figures 1 to 4.

Figure 7:
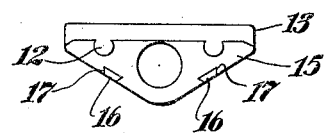
Figure 7 is a top plan view of still another modified construction of the shim.
Figure 4:
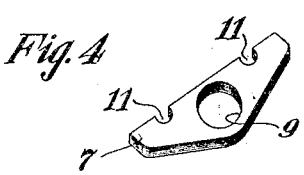
Figure 4 is a perspective view of the upper body portion.
Figure 8:
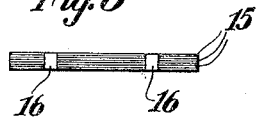
Figure 8 is a view in rear elevation of the shim shown in Figure 7.

The shim shown in Figures 7 and 8 which is similar in construction to the one shown in Figure 6, is provided with members 16 preferably formed of Babbitt-metal or the like, fitting within, and frictionally engaging the walls of registering dove-tailed recesses 17 formed in the rear edges of the sheets or body portions 15. These members 16 serve, in conjunction with the facing member 13, to hold the body portions 15 in assembled position, and are especially useful in connection with shims having a body of comparatively large surface area.

In use, the thickness of the shims, shown in Figures 6, 7 and 8, may be reduced as desired by simply removing one or more of the body portions 15. It is to be noted that these forms of shim possess the advantages of a laminated shim of the type in which the laminations are secured to one another with a binder, but that they are far less expensive to manufacture.

In each of the modifications shown, it is to be noted that the facing member 13 extends throughout the entire length and width of the inner or front edge of the body of the shim, and that, therefore, it effectually prevents oil from entering between the several body portions of the shim and also prevents undue escape of oil from pressure lubricated bearings. Furthermore, as the several body portions are held in assembled relation by the frictional engagement therewith of the facing member, the removal of a portion of one of the body portions, or of one or more of the body portions, may be effected without disarranging the portions comprising the body of the shim.

While I have illustrated certain embodiments of the principles of my invention, I do not wish to be limited thereby, but wish to cover the principles of my invention in whatever form they may be usefully employed.

I claim:

1. A shim including a plurality of superposed body portions having their adjacent surfaces in engagement with one another and single independent means constituting a bearing surface extending along the forward edges of said body portion and interlocking therewith, for holding all of said body portions assembled.

2. A shim including a plurality of superposed body portions having registering recesses formed in the front and rear faces thereof, and independent means positioned within said registering recesses for holding said body portions assembled.

3. A shim including a plurality of superposed hard metal body portions having registering recesses formed therein, and a bearing metal facing member at one edge of the body provided with means frictionally engaging the registering recesses of all of said body portions to hold said body portions assembled.

4. A shim including a body comprising a plurality of superposed body portions having their adjacent surfaces in engagement with one another, said body being provided with a recess, and a separable facing member at one edge of said body provided with a portion engaging said recess and serving to hold said body portions assembled.

5. A shim comprising a base member extending across substantially the entire bottom thereof, a plurality of laminations superposed on said base to increase the thickness thereof, a portion of said base projecting above the plane thereof to form a shoulder and a plurality of lugs, projecting above said base adjacent said shoulder to retain said laminations on said base.

6. A shim comprising a base member and laminations superposed thereon, one edge of said base member projecting above the base to the height of the laminations to form a shoulder therefor, said projecting part being further provided with interlocking means to retain said laminations to said base.

7. A shim comprising a base having dove-tailed recesses therein, a facing member extending across substantially the entire base and projecting above the top thereof forming a shoulder having dove-tailed projections, and a plurality of laminations superposed on said base to increase the thickness thereof, said laminations having dove-tailed recesses engaging the projections on said facing member to retain said laminations on said base.

8. A shim comprising a base member and laminations superposed thereon, one edge of said base member projecting above the base to the height of the laminations to form a shoulder therefor, said projecting parts being further provided with interlocking means to retain said laminations on said base and retain the projecting part on said base.

In testimony whereof I have affixed my signature to this specification.

BRADFORD DARRACH, Jr.